G. H. FORSYTH.
DISK WHEEL.
APPLICATION FILED JAN. 31, 1921.
1,420,651. Patented June 27, 1922.
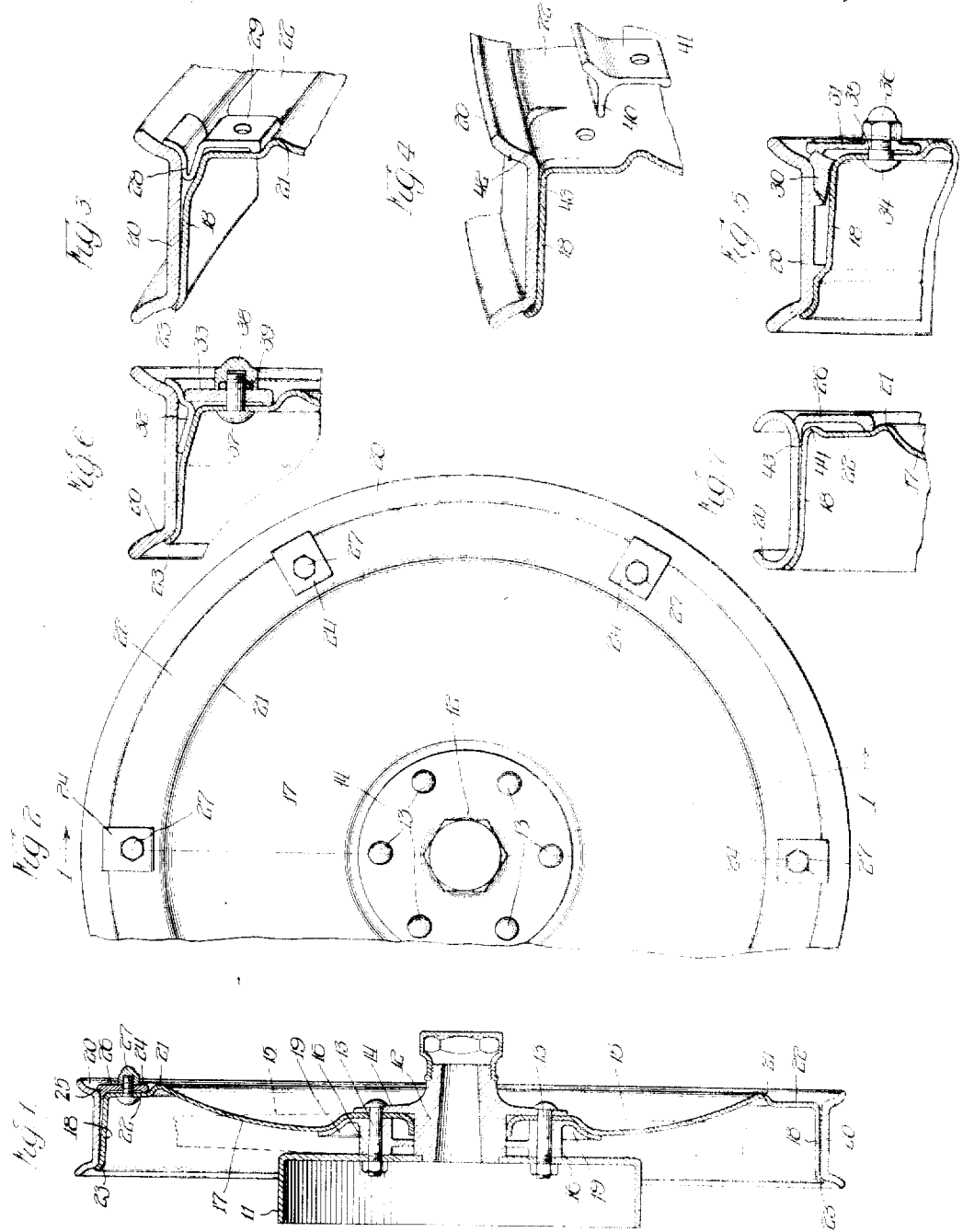

UNITED STATES PATENT OFFICE.

GEORGE H. FORSYTH, OF HARVEY, ILLINOIS.

DISK WHEEL.

1,420,651.　　Specification of Letters Patent.　Patented June 27, 1922.

Application filed January 31, 1921.　Serial No. 441,151.

*To all whom it may concern:*

Be it known that I, GEORGE H. FORSYTH, a citizen of the United States, residing at Harvey, in the county of Cook and State of Illinois, have invented certain new and useful Improvements in Disk Wheels, of which the following is a specification.

By reason of the growing scarcity of materials suitable for employment in the making of wooden wheels and the rapid deterioration of the same under stress of weather and liability to damage by rough usage, they are coming into disfavor; the wire wheel has many objectionable features inherent in its manufacture and employment; the steel wheel of spoke or "artillery" type, while desirable from some points of view, is very expensive to manufacture, and not the most efficient in use; and while the steel disk wheel possesses many advantages over other types, the trade is slow to adopt the same by reason of the fact that it apparently requires a doing away with previous standards, and the sacrifice of much labor and money expended in the development of a particular pattern of hub and rim adopted as standard by different car manufacturers. Moreover, hundreds of thousands of cars now in use would be equipped with disk wheels were it not that in doing so the car owner would sacrifice the value of his present wheels as an entirety and be required to purchase a new set of wheels complete in all their parts including hubs and rims.

Prominent among the objects of the present invention are the adaptation of a disk steel wheel to the utilization in connection therewith of prevailing standards of hub and rim structures, whereby the one wheel is rendered suitable to adoption by different car manufacturers for use upon particular makes of cars, and the wheels are susceptible of application to cars now in use without necessitating the purchase of new hubs and rims. As to this feature of the invention, this application is a continuation of my copending application, Serial No. 264,253.

A further feature of the invention is the provision of means for assembling the wheel with a demountable rim in such manner as to insure accuracy of placement of the rim, an improved appearance of the assembled wheel and rim, a self-adjusting relation between the two in case of careless assemblage, together with other advantages which will be made apparent as the invention is understood.

In order that the invention in its various aspects may be readily understood and appreciated by those skilled in the art, preferred and modified embodiments of the invention are set forth hereinafter by way of description and exemplified in the accompanying drawings. It will be readily appreciated, however, that the description and drawings are illustrative only and are not to be taken in an unnecessarily limiting sense.

In the drawings—

Fig. 1 is a section through a disk wheel embodying the invention, taken on the line 1—1 of Fig. 2;

Fig. 2 is a face view of the wheel;

Figs. 3 and 4 are detail views in perspective illustrating two different constructions having to do with wheel and rim assembling;

Figs. 5 and 6 are detail sectional views illustrating the manner of assembling the wheel with straight side rims; and Fig. 7 is a detail sectional view illustrating the assemblage of the wheel with a clincher rim.

Having particular reference to the drawing by way of illustrative description the reference numeral 11 designates the usual brake drum assembled with the ordinary hub 12 by means of bolts 13 passing through the drum and the hub flange 14. At 15 are shown in dotted lines the wood spokes of the ordinary artillery type of wheel.

In that type of wheel the spokes are accommodated within the space between two radially projecting members one of which is usually integral with the hub and called the hub flange, while the other is capable of removal and called the hub plate. In either case they are plates associated with the hub and that term is used herein to designate either one or both of the integral and removable members disposed in front of and at the rear of the spokes. As shown in Fig. 1 the rear hub plate is formed as the brake drum 11, whereas in one of the front wheels the plate would extend radially but little farther than the bolts 13.

Manufacturers of cars and wheels have their standard patterns of hubs and it is to the advantage of the trade that the same hub be susceptible of use for both the wood wheel and the disk wheel. Similarly where the owner of a car desires to change from wood to disk wheels much less expense is involved if he can use the hubs of his car instead of discarding the wheels as an entirety and purchasing new wheels including hubs.

To enable standard hubs as designed for wood wheels to be utilized in disk wheel construction, I provide a filler member 16 for disposition within the space between the front and rear hub plates 11 and 14, which space is provided for the accommodation of the spokes 15 of a wood wheel, and the metal disk 17, having the peripheral tire-carrying felly portion 18, is secured to the forward hub plate or flange 14 upon the interposed filler member 16, the bolts 13 being used, as in the case of wood spokes, to clamp the hub plate or flange 14 and the hub plate or drum 11 upon the inner portion of the disk 17 and the filler member 16. Advantageously the filler member has a radially projecting skirt 19 which serves as a rear abutment for the most deeply dished portion of the disk just beyond the hub plate, greatly reinforcing the disk in that region and, by reason of its extended bearing, increasing the homogeneity of the wheel structure adjacent the hub.

The peripheral portion of the disk is rearwardly bent to constitute a felly upon which is received the demountable rim 20. To further simulate the appearance of felly-thickness, the disk is bent rearwardly at 21 and then extends in a substantially radial direction at 22, the effect being presented of a flat ring about the wheel just within the rim, as is clearly brought out in Fig. 2 at 22.

In a disk wheel adapted for use in connection with demountable rims as also in a wood wheel of the demountable rim type the outer face of the felly is slightly inclined to the wheel axis and along its rear edge is provided with an outstanding inclined beaded portion 23 upon which the rear edge of the rim will ride, thus determining the proper position of the rim upon the wheel. In cooperation with the inclined face of the felly and the beaded portion 23 shim members 24 are employed having wedge-like portions 25 for entry between the felly and the forward edge of the rim, said shims having associated therewith either as integral or separate elements a body portion 26 extending inwardly of the wheel along the felly portion 22, while bolts 27 pass through the shim element 26 and the felly portion 22 for the purpose of forcing the shim inwardly beneath the rim with the result that the rim is rearwardly pressed against the beaded portion 23 and outwardly, being supported by its forward edge, upon the wedge-like portion 25.

It not infrequently happens, in the placing of a demountable rim upon a wheel that more resistance is met with at one point than another and without care the rim will be unsymmetrically positioned upon the wheel. A variation of a small fraction of an inch will cause lateral friction on the tire and its rapid wear.

In order to insure the proper positioning of the rim on the wheel I provide an amount of resiliency or yielding in the rim-positioning means, whether in the wedging portion of the shim itself, or in the body of the shim, or in the bolt connection between the shim body and the felly.

In Figs. 1 and 2 the body of the shim is shown as possessing a degree of resiliency; in Fig. 3 both the wedge portion 28 of the shim and also the body portion 29 are resilient; the quality of resiliency may be incorporated in that form of shim shown in Fig. 4; in Fig. 5 a wedging shim member 30 is shown which advantageously comprises a split ring extending entirely around the wheel used in connection with separate shim bodies 31 of spring metal; the wedging shim member 32 of Fig. 6 is in the form of a split ring extending entirely round the wheel and having inherent yielding qualities, used in connection with separate unyielding shim bodies 33.

In Fig. 5 the yielding shim body 31 is shown as associated with an attaching bolt 34 having a shouldered portion 35 and an acorn nut 36. The shoulder 35 forms an abutment which limits the inward movement of the shim body 31.

In the embodiment shown in Fig. 6 the unyielding shim body 33 is used in connection with attaching bolts 37 having acorn nuts 38 hollowed out to receive a spring washer 39 whereby is provided a spring relation between the bolt and shim body.

By the provision of resiliency in the rim positioning means, as above described, after the nuts on the bolts are drawn home, there remains stored up spring energy to force the rim farther onto the felly, and as the shim bolts about the wheel are drawn up in succession this spring action will serve automatically to equalize pressure on the rim at different points to bring about the proper positioning of the rim. Thus any looseness in the individual nuts which supposedly had been screwed up to their full limit will become apparent upon the completion of the job, and guard against improper placement of the rim.

In Fig. 3, it will be observed that the body 29 of the shim is seated within a recess of the side portion 22 of the felly, whereby a substantially flush felly surface is provided, adding to the appearance of the wheel.

In Fig. 4 that portion of the felly immediately underlying the rim is recessed to receive the wedge portion 40 of the shim while the body portion 41 overlies the flat portion 22 of the felly. This enables the wedging inclination of the felly face to be confined to the recessed portion 42 leaving the greater portion of the felly underlying the rim at 18 to be substantially parallel to the rim, thus avoiding the usual gap at 43 around the wheel beneath the forward edge of the rim for the entry of water, mud, etc.

In Fig. 7 the presence of a gap for the admission of water and the like is guarded against by extending the parallel relation of the felly and rim forwardly beyond that shown in Figs. 1, 3, 5 and 6 and then providing a fillet at 44 bringing the metal of the disk back to the plane of the portion 22.

I claim:

1. The combination with a standard hub construction including an integral hub flange and a removable hub plate spaced apart to accommodate spoke ends therebetween, of a filler member disposed within said space, and a metal disk secured to the hub flange upon the filler member and having a peripheral tire-carrying portion, whereby to utilize the standard wood wheel hub in a metal wheel construction, the filler member having a portion radially extending behind and serving as a rear abutment for that portion of the disk adjacent the flange.

2. In a disk wheel, the combination of a hub having rigidly associated hub plates spaced apart, the rear plate of larger diameter than the front plate, a filler member within the space between the two plates, and the inner portion of the disk body of the wheel secured upon the filler member by the hub plate and rearwardly supported beyond the front plate by the filler member.

3. A disk wheel comprising a body portion and a peripheral tire-carrying portion, the body portion of the disk forwardly beaded a slight distance inwardly from its periphery, that portion of the disk between the bead and felly being substantially parallel to the plane of the wheel to accommodate rim-positioning shims and to simulate the side face of a felly, said side face recessed at intervals to accommodate the shims and to present with the disk a substantially flush surface.

4. A disk wheel comprising a body portion and a peripheral tire-carrying portion, the body portion of the disk forwardly beaded a slight distance inwardly from its periphery, that portion of the disk between the bead and felly being substantially parallel to the plane of the wheel to accommodate rim-positioning shims and to simulate the side face of a felly, said side face provided adjacent its outer extremity with a recess extending at a slight inclination to the wheel axis to accommodate the wedge portions of the shims.

In testimony whereof I have hereunto subscribed my name in the presence of two subscribing witnesses.

GEORGE H. FORSYTH.

Witnesses:
 LEWIS T. GREIST,
 FRANCIS K. GILLESPIE.

Certificate of Correction.

It is hereby certified that in Letters Patent No. 1,420,651, granted June 27, 1922, upon the application of George H. Forsyth, of Harvey, Illinois, for an improvement in "Disk Wheels," errors appear in the printed specification requiring correction as follows: Page 3, after line 64 insert the following as claims 5 and 6:

*5. In a disk wheel, the combination with a standard hub construction including hub plates, of a disk body secured by said plates to the hub, one of the plates having associated therewith means for spacing the plates apart a distance corresponding substantially to the space occupied by the spokes of a wooden wheel, the disk laterally supported at a point radially beyond the front plate, whereby to utilize the standard wood wheel hub in a reenforced disk wheel construction.*

*6. In a disk wheel, the combination with a standard hub construction including hub plates, of a disk body secured to the hub, the plates spaced apart a distance corresponding substantially to the space occupied by the spokes of a wooden wheel and the disk laterally supported at a point radially beyond one of the plates, whereby to utilize a standard wood wheel hub in a reenforced disk wheel construction.;* and that the said Letters Patent should be read with these corrections therein that the same may conform to the record of the case in the Patent Office.

Signed and sealed this 8th day of August, A. D., 1922.

[SEAL.]
KARL FENNING,
*Acting Commissioner of Patents.*